Oct. 25, 1960     N. K. FIGGINS ET AL     2,957,651
MODEL AIRPLANE LAUNCHER
Filed Sept. 8, 1958
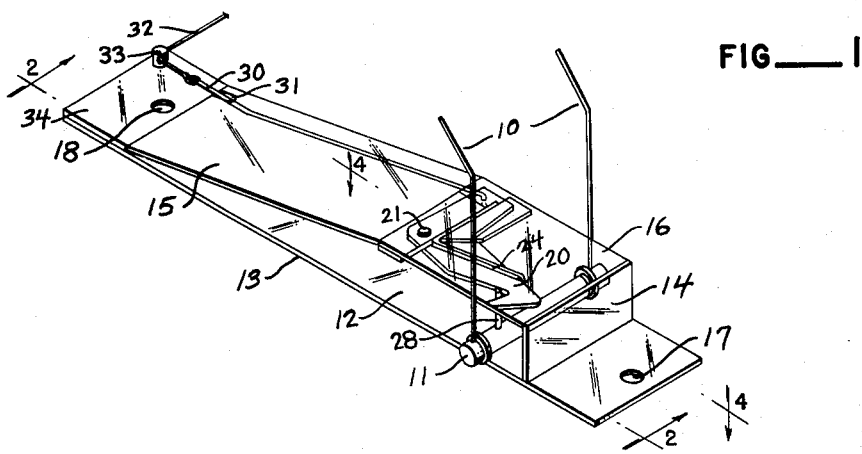
FIG.__1
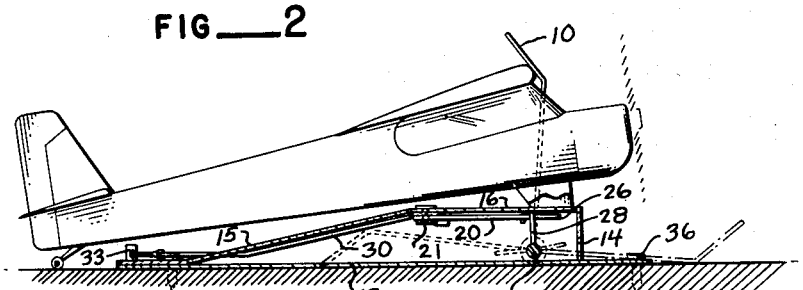
FIG.__2
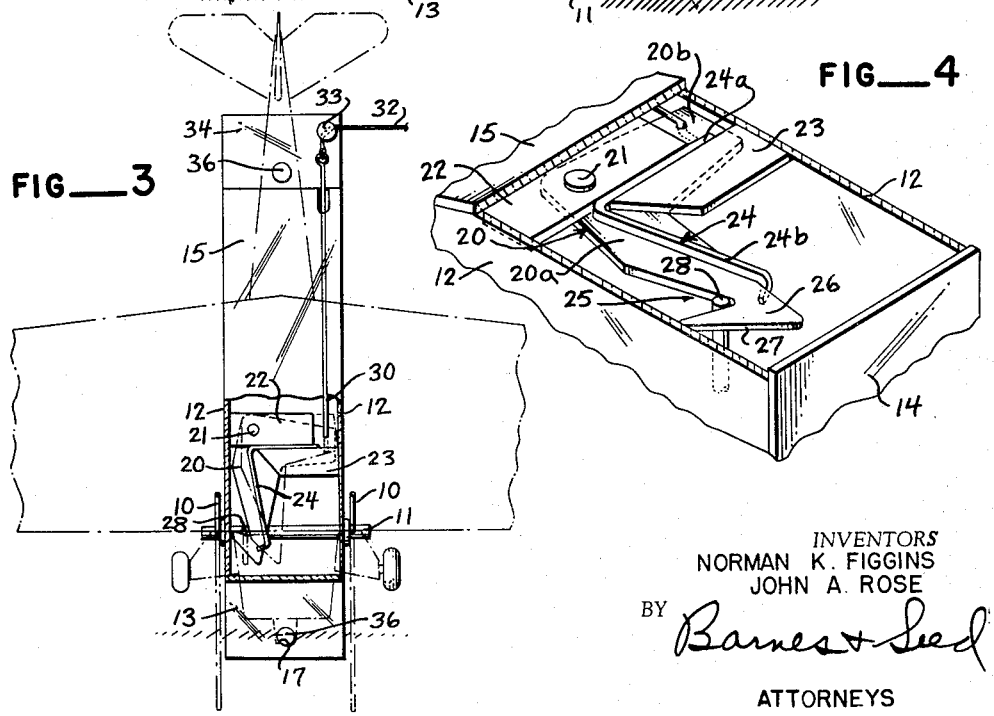
FIG.__3
FIG.__4
INVENTORS
NORMAN K. FIGGINS
JOHN A. ROSE
BY *Barnes & Seed*
ATTORNEYS

United States Patent Office 2,957,651
Patented Oct. 25, 1960

2,957,651

MODEL AIRPLANE LAUNCHER

Norman K. Figgins, 20224 83rd W., and John A. Rose, 8426 200th SW., both of Edmonds, Wash.

Filed Sept. 8, 1958, Ser. No. 759,683

11 Claims. (Cl. 244—63)

The present invention relates to launchers of the captive self-powered type, and more specifically to a device whereby the ground pilot can effect plane takeoff without need of an assistant.

Such captive planes are normally flown with the ground pilot stationed in the center of a flight circle to handle the control cables for the aircraft. The plane is launched at the circle perimeter and hence the pilot must be remote to the plane at takeoff. This has necessitated the help of an assistant to manually release the plane after sufficient engine speed has been reached.

Accordingly, the present invention aims to provide reliable launching apparatus of simple and economical construction which will hold and release a captive self-powered model airplane by remote control from the center of a flight circle without danger of interference to the plane after its release.

As a further object of our invention we provide such an airplane launcher which can be used with a substantial variety of planes.

The invention also aims to provide a launcher which is very easy to load and operate and which is compact for storage.

Yet additional objects and advantages will, with the foregoing, appear and be understood in the course of the following description and claims, the invention consisting in the novel construction and in the adaptation and combination of parts hereinafter described and claimed.

In the accompanying drawing:

Figure 1 is a perspective view of our model airplane launcher in cocked position ready to receive a plane.

Fig. 2 is a longitudinal vertical sectional view of the launcher taken along the line 2—2 of Fig. 1 and receiving a plane for takeoff.

Fig. 3 is a top plan view with part of the top of the housing broken away.

Fig. 4 is a fragmentary perspective view with the top of the housing broken away and taken generally as shown by the line 4—4 of Fig. 1.

Referring to the drawings it is seen that our launcher has a pair of vertically swinging release legs 10 which are mounted at the end of a rock shaft 11. This shaft is journaled inboard of the legs near the forward end of a pair of side walls 12 which together with a base plate 13, front wall 14, ramp 15, and cover plate 16 provide a housing for a release mechanism. These housing parts may be fabricated from clear plastic and welded together or can be constructed in any other suitable manner. The base plate 13 projects fore and aft and is apertured to provide anchor holes 17—18.

The housed release mechanism includes a spring-loaded bell crank 20 which is pivoted by a rivet 21 about a vertical axis. This rivet is seated in a head plate 22 whose forward edge together with a retainer plate 23 defines a groove to receive one leg 24a of an L-spring 24. The other leg 24b of the spring is hooked around the inside edge of the forwardly extending catch arm 20a of the bell crank 20. This arm is V-notched at 25 along its outside edge to form a latch hook 26 and has its free end sloping forwardly from the tip of the hook to the inside spring-engaged edge of the arm to form a front cocking cam 27. For engagement in the notch 25 the rock shaft presents a projecting catch pin 28 which parallels the release legs 10. In this regard it will be noted that the pin 28 does not seat completely in the vertex of the notch 25 so that there is sufficient clearance to permit the rock shaft to be turned such as to lower the release legs 10 in a rear storage position alongside of the housing without retracting the catch hook 26 from its normal spring-urged engagement with the right side wall 12. This rear storage position is shown by broken lines in Fig. 2.

The other arm 20b of the bell crank extends laterally of the housing as a trigger lever to move the catch arm in opposition to the spring 24. For this purpose the arm 20b interfits with an offset formed at the forward end of a pull rod 30 which extends rearwardly beneath the ramp 15 and out through an opening 31 near the base thereof. At its rear end the rod 30 has an eye to receive one end of a pull cord or cable 32 which is threaded through a transverse passage in a guide post 33 so as to freely extend laterally of the launcher. The guide post is anchored on an auxiliary base plate 34 which is flush with the bottom end of the ramp.

To prepare for operation our airplane launcher is anchored tangentially of the intended flight circle as by driving nails 36 into the ground through the anchor holes 17—18. The release legs are then raised from their storage position alongside the housing. Raising of the release legs swings the catch pin 28 upwardly into engagement with the catch hook 26 to hold the release legs in a vertical cocked position. The pilot, after stringing his plane control cables and the launching cable 32 to the center of the flight circle, sets the plane in launching position with its front wheels straddling the launcher and the leading edge or its wings in engagement with the release legs 10. In this regard it is considered desirable to have the free end portions of the release legs bent rearwardly somewhat as illustrated for better holding of the wings. At any rate, the pilot now starts the engine and when it is running properly leaves the plane to go to the controls at the center of the flight circle. During this time the plane is held in launching position by the release legs 10. To then launch the plane the pilot need only pull on the launching cable 32. This action causes the trigger arm 20b, and hence the catch arm 20a, to turn counter-clockwise when viewed from the top and thereby releases the catch pin 28 from the hook 26. At this time the release arms drop to the forward broken line position of Figure 2 in response to the forward thrust exerted thereon by the powered plane which is now free to take off with its tail travelling up the ramp 15.

To reload our launcher it is only necessary to pull back on the release legs thereby bringing the catch pin 28 into engagement with the cocking cam 27. Further rearward pull forces the catch arm 20a to swing in opposition to the spring pressure until the catch pin has cleared the bill of the hook 26 whereupon the latter springs back into its catch position.

It is thought that the invention will have been clearly understood from the foregoing detailed description of our illustrated preferred embodiment. Minor changes in the details of construction will suggest themselves and we accordingly intend that no limitations be implied and that the hereto annexed claims be given a scope fully commensurate with the broadest interpretation which the employed language fairly permits.

What we claim is:

1. In a model airplane launcher, a housing adapted to be anchored in the ground, release means pivotally mounted on said housing to swing forwardly from an upright plane holding position to a lowered plane releasing position, catch means operatively associated with said release means and movable from a normally active position holding said release means upright into an inactive position freeing the release means, and remote control means operatively associated with said catch means for selectively moving the latter into said inactive position to thereby free said release means at will.

2. In a model airplane launcher, a housing adapted to be anchored in the ground, release means pivotally mounted on said housing to swing forwardly from an upright plane holding position to a lowered plane releasing position, catch means operatively associated with said release means and urged by a spring from an inactive position into an active position for holding said release means upright, and remote control means operatively connected to said catch means and including a pull line terminating remote to said catch means for selectively moving the latter into said inactive position against the pressure of said spring to thereby remotely free said release means at will.

3. In a model airplane launcher, a housing adapted to be anchored in the ground, release means carried by said housing movable from a plane holding position to a plane releasing position, catch means operatively associated with said release means and urged by a spring from an inactive position into an active position for holding said release means upright, and remote control means operatively associated with said catch means for selectively moving the latter into said inactive position to thereby remotely free said release means at will.

4. In a model airplane launcher, a housing adapted to be anchored in the ground, release means carried by said housing movable from a plane holding position to a plane releasing position, a catch pin operatively interconnected with said release means to move in unison therewith, catch means operatively associated with said catch pin and movable from a normally active position catching said pin to keep said release means in a plane holding position into an inactive position freeing said pin and hence freeing said release means, and remote control means operatively associated with said catch means for selectively moving the latter into said inactive position to thereby remotely free said release means at will.

5. In a model airplane launcher, a housing adapted to be anchored in the ground, release means carried by said housing movable from a plane holding position to a plane releasing position, a catch pin operatively interconnected with said release means to move in unison therewith, a catch hook operatively associated with said catch pin and movable from a normally active position catching said pin to keep said release means in a plane holding position into an inactive position freeing said pin and hence freeing said release means, spring means yieldingly urging said catch hook into said active position, and remote control means operatively associated with said catch hook for selectively moving it into said inactive position against the pressure of said spring means to thereby remotely free said release means at will.

6. In a model airplane launcher, a housing adapted to be anchored in the ground, release means pivotally mounted on said housing, to swing forwardly from an upright plane holding position to a lowered plane releasing position, a catch pin generally parallel to said release means and rigidly interconnected therewith for unitary swinging movement, a catch hook swingable in a generally horizontal plane from a normally active position engaging the front of said pin to keep said release means in a plane holding position into an inactive position freeing said pin and hence freeing said release means, spring means yieldingly urging said catch hook into said active position, and remote control means operatively associated with said catch hook for selectively swinging it into said inactive position against the pressure of said spring means to thereby remotely free said release means at will.

7. In a model airplane launcher, a housing adapted to be anchored in the ground, release means pivotally mounted on said housing to swing forwardly from an upright plane holding position to a lowered plane releasing position, a catch pin generally parallel to said release means and rigidly interconnected therewith for unitary swinging movement, a catch hook having its shank swingable about a generally upright axis from a normally active position with the bill of said hook engaging the front of said pin to keep said release means in a plane holding position into an inactive position freeing said pin and hence freeing said release means, a lever operatively connected to said shank and forming a bell crank therewith, spring means operatively connected to said bell crank for yieldingly urging said catch hook into said active position, and a pull line operatively interconnected with said lever and terminating remote to said release means for selectively swinging said catch hook into said inactive position in opposition to said spring means to thereby remotely free said release means at will.

8. In a model airplane launcher, an elongated housing extending fore and aft, means for anchoring said housing on the ground, a swing shaft extending laterally through the housing and having parallel release legs at the ends thereof swingable forwardly with the shaft from an upright plane-wing holding position to a lowered plane releasing position, a catch pin on said shaft within said housing and generally parallel to said release legs, a catch hook within said housing swingable about a generally upright axis from a normally active position with the bill of said hook stopped by a respective side of said housing and engaging the front of said pin to keep said release legs upright into a retracted inactive position freeing said pin and hence freeing said release legs, a lever forming a bell crank with said hook, spring means operatively associated with said bell crank for yieldingly urging said catch hook into said active position, and pull means connected to said lever and extending out of said housing to terminate remote to said release legs for selectively swinging said catch hook into said retracted inactive position in opposition to said spring means to thereby remotely free said release legs at will.

9. The launcher of claim 8 in which the front edge of the bill of said catch hook slopes rearwardly toward its tip so that rearward pulling of the release legs after a plane launching will effect a reloading of the launcher by engaging said front edge and thereby causing sufficient retraction of said catch hook for rearward passage thereby of the release legs.

10. The launcher of claim 8 in which said catch pin and release legs are free to swing rearwardly into a horizontal storage position when said catch hook is in its said active position.

11. The launcher of claim 8 in which said pull means includes a line extending rearwardly to a guide post mounted on said housing and adapted to divert said line at cross angles to said housing at a point located well aft of said release legs.

References Cited in the file of this patent

UNITED STATES PATENTS

| | | |
|---|---|---|
| 1,044,161 | Froberg | Nov. 12, 1912 |
| 1,316,620 | Jungclas | Sept. 23, 1919 |
| 1,432,815 | Weinberg | Oct. 24, 1922 |
| 1,544,576 | Hawkins | July 7, 1925 |
| 1,674,771 | Fox | June 26, 1928 |
| 2,499,666 | Mikolajczyck | Mar. 7, 1950 |

FOREIGN PATENTS

| | | |
|---|---|---|
| 675,182 | France | Oct. 29, 1929 |
| 1,126,405 | France | July 30, 1956 |